United States Patent
Park et al.

(10) Patent No.: US 11,577,290 B2
(45) Date of Patent: Feb. 14, 2023

(54) APPARATUS FOR CLEANING ROLLING ROLL FOR ELECTRODE AND CLEANING METHOD

(71) Applicant: LG Chem, Ltd., Seoul (KR)

(72) Inventors: Kun Ha Park, Daejeon (KR); Seung Gi Yang, Daejeon (KR); Ung Ju Lee, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 17/059,624

(22) PCT Filed: Jan. 23, 2020

(86) PCT No.: PCT/KR2020/001178
§ 371 (c)(1),
(2) Date: Nov. 30, 2020

(87) PCT Pub. No.: WO2020/153793
PCT Pub. Date: Jul. 30, 2020

(65) Prior Publication Data
US 2021/0213503 A1    Jul. 15, 2021

(30) Foreign Application Priority Data
Jan. 25, 2019 (KR) .................. 10-2019-0009708

(51) Int. Cl.
*B21B 45/02* (2006.01)
*B08B 1/00* (2006.01)
(Continued)

(52) U.S. Cl.
CPC .......... *B21B 45/0287* (2013.01); *B08B 1/005* (2013.01); *B08B 1/006* (2013.01);
(Continued)

(58) Field of Classification Search
None
See application file for complete search history.

(56) References Cited

U.S. PATENT DOCUMENTS

| | | | |
|---|---|---|---|
| 4,820,350 | A | 4/1989 | Demuth et al. |
| 4,852,209 | A | 8/1989 | Svenka et al. |

(Continued)

FOREIGN PATENT DOCUMENTS

| | | |
|---|---|---|
| CN | 207386166 U | 5/2018 |
| CN | 207857414 U | 9/2018 |

(Continued)

OTHER PUBLICATIONS

Google Patents translation of CN207857414U retrieved from https://patents.google.com/patent/CN207857414U/en?oq=cn+207857414 on Mar. 12, 2022 (Year: 2022).*
Google Patents translation of CN 207386166 retrieved from https://patents.google.com/patent/CN207386166U/en?oq=CN+207386166+U on Mar. 12, 2022 (Year: 2022).*

(Continued)

*Primary Examiner* — Eric W Golightly
(74) *Attorney, Agent, or Firm* — Lerner, David, Littenberg, Krumholz & Mentlik, LLP

(57) ABSTRACT

The present invention relates to an electrode rolling roll cleaning apparatus for removing pollutants on an electrode rolling roll, the apparatus comprising: a cleaning part for cleaning a rolling roll by bringing the rolling roll into contact with a cleaning member; an air spraying part for spraying air onto the rolling roll; a heating part for applying heat to the rolling roll so as to dry the rolling roll; and a scraper part for mechanically removing a cleaning liquid and foreign substances attached to the rolling roll.

13 Claims, 10 Drawing Sheets

(51) Int. Cl.
   *B08B 1/02* (2006.01)
   *B08B 3/08* (2006.01)
   *B08B 3/10* (2006.01)
   *B08B 5/02* (2006.01)
   *B08B 7/00* (2006.01)
   *B08B 7/04* (2006.01)
   *H01M 4/04* (2006.01)

(52) U.S. Cl.
   CPC .................. *B08B 1/02* (2013.01); *B08B 3/08* (2013.01); *B08B 3/10* (2013.01); *B08B 5/023* (2013.01); *B08B 7/0071* (2013.01); *B08B 7/04* (2013.01); *H01M 4/04* (2013.01)

(56) References Cited

U.S. PATENT DOCUMENTS

| | | | |
|---|---|---|---|
| 5,964,960 | A | 10/1999 | Boeck |
| 2013/0068121 | A1 | 3/2013 | Claeys |

FOREIGN PATENT DOCUMENTS

| | | |
|---|---|---|
| CN | 208230342 U | 12/2018 |
| JP | H09078364 A | 3/1997 |
| JP | H10146606 A | 6/1998 |
| JP | 2012245492 A | 12/2012 |
| JP | 2013123666 A | 6/2013 |
| KR | 20130109548 A | 10/2013 |
| KR | 20150045231 A | 4/2015 |
| KR | 101525060 B1 | 6/2015 |
| KR | 20160083716 A | 7/2016 |

OTHER PUBLICATIONS

Google Patents translation of KR101525060 retrieved from https://patents.google.com/patent/KR101525060B1/en?oq=KR+101525060+B1 on Mar. 13, 2022 (Year: 2022).*

International Search Report for Application No. PCT/KR2020/001178 dated May 4, 2020, 2 pages.

Search Report dated Apr. 26, 2022 from the Office Action for Chinese Application No. 202080002758.2 dated May 5, 2022, 2 pgs.

* cited by examiner

PRIOR ART
【FIG. 1】
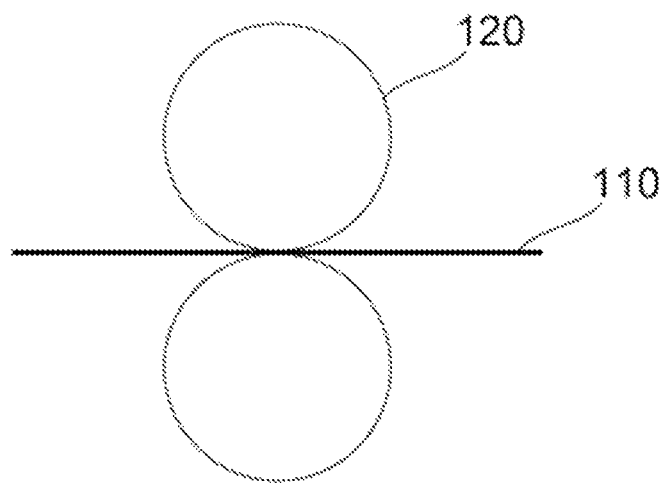

[FIG. 2]
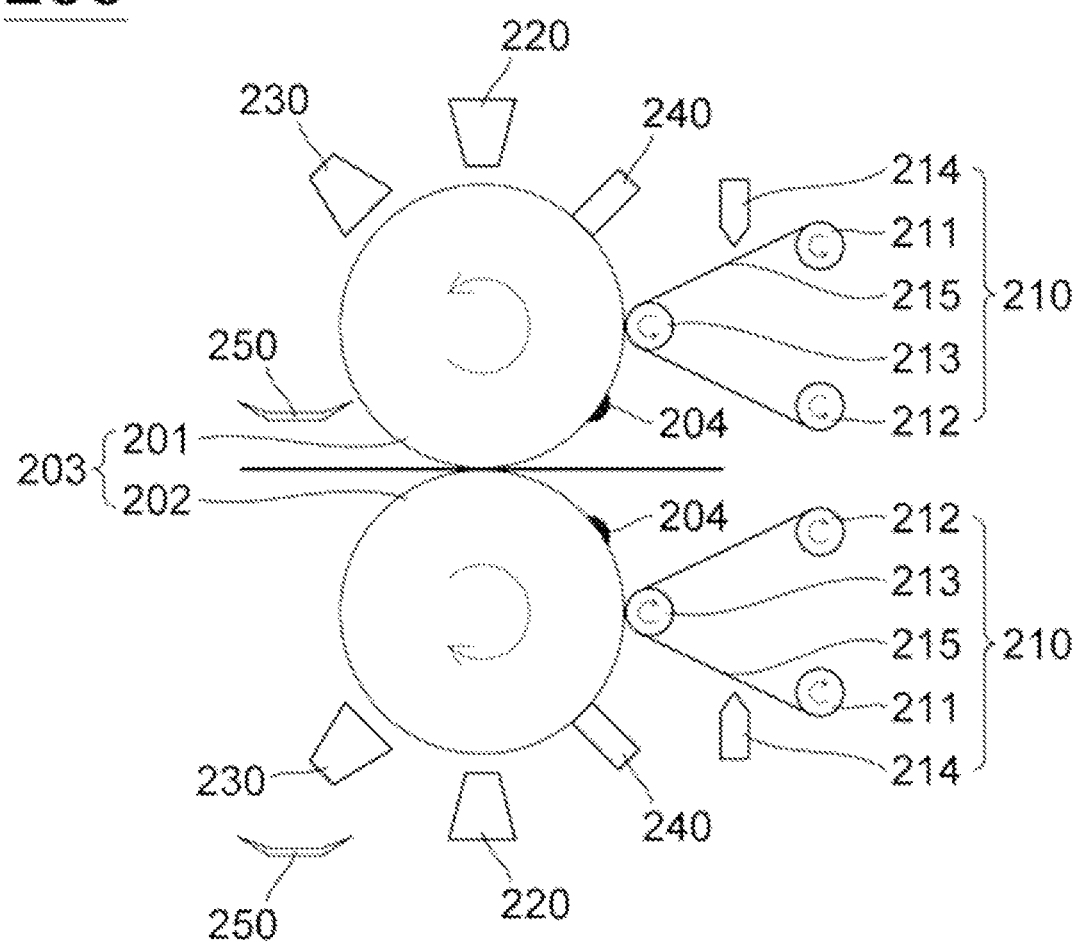

[FIG. 3]
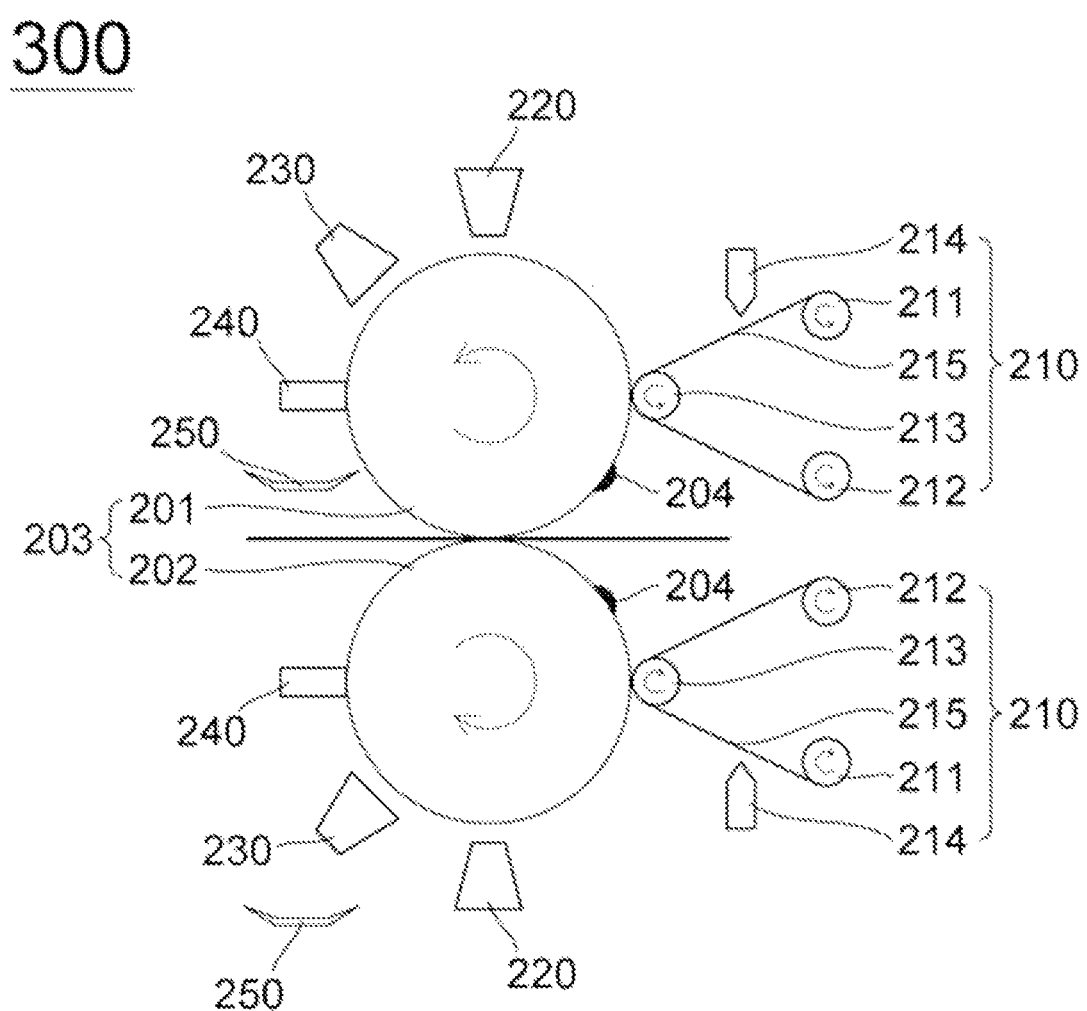

[FIG. 4]
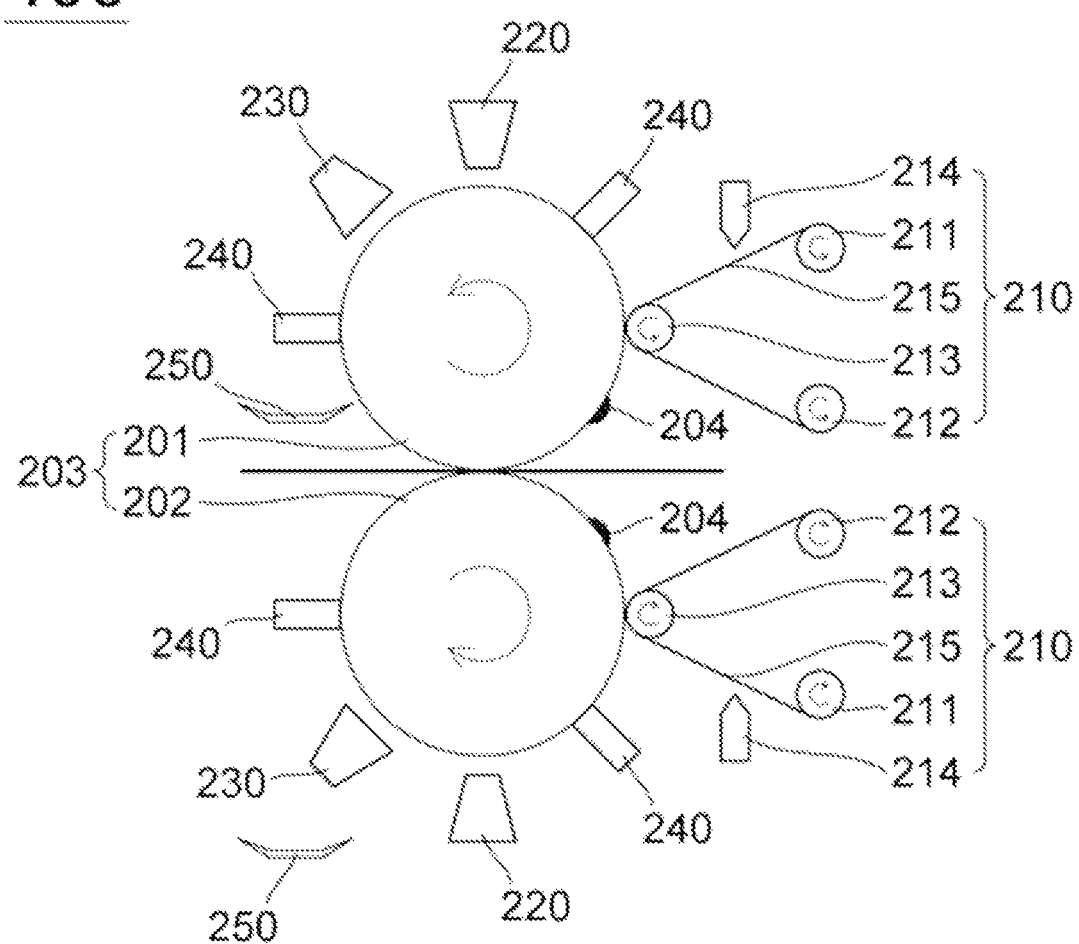

[FIG. 5]
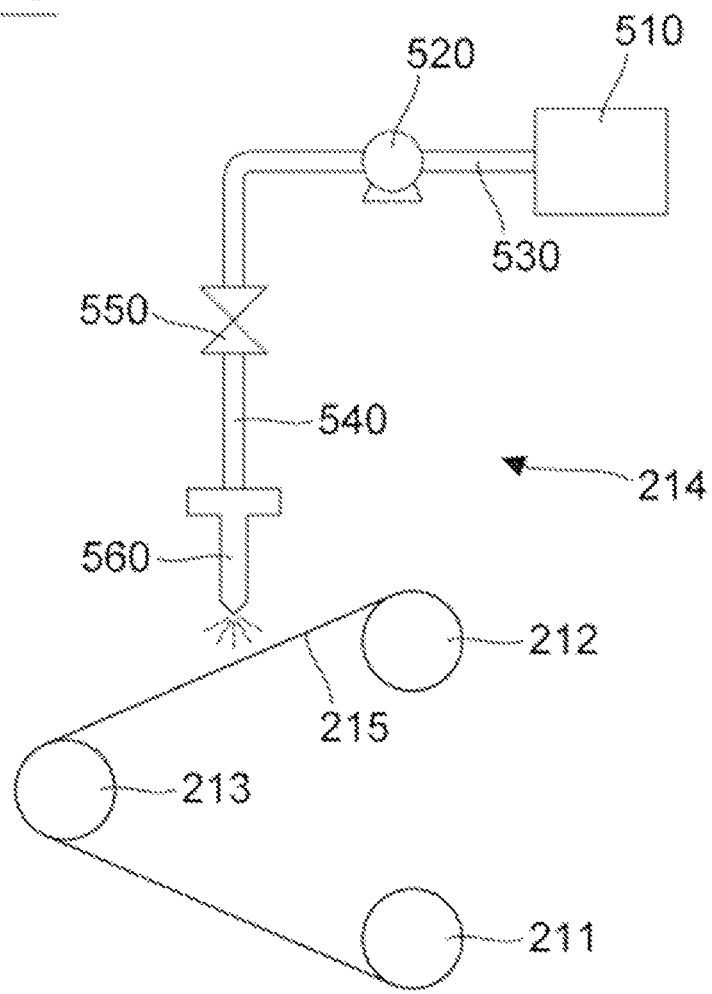

【FIG. 6】
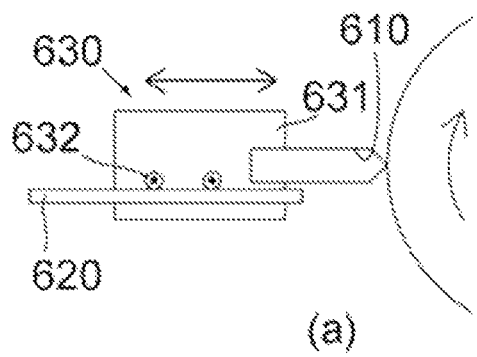
(a)
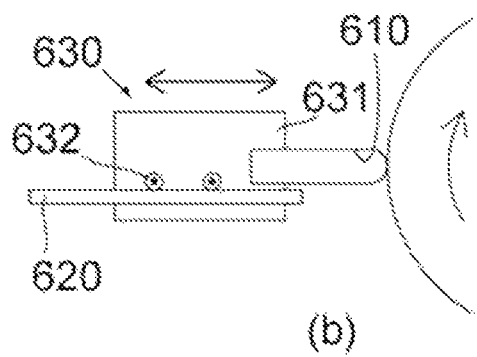
(b)
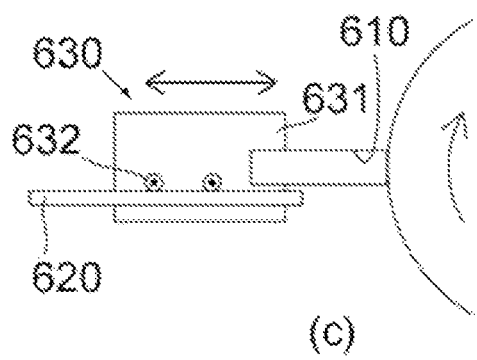
(c)

[FIG. 7]
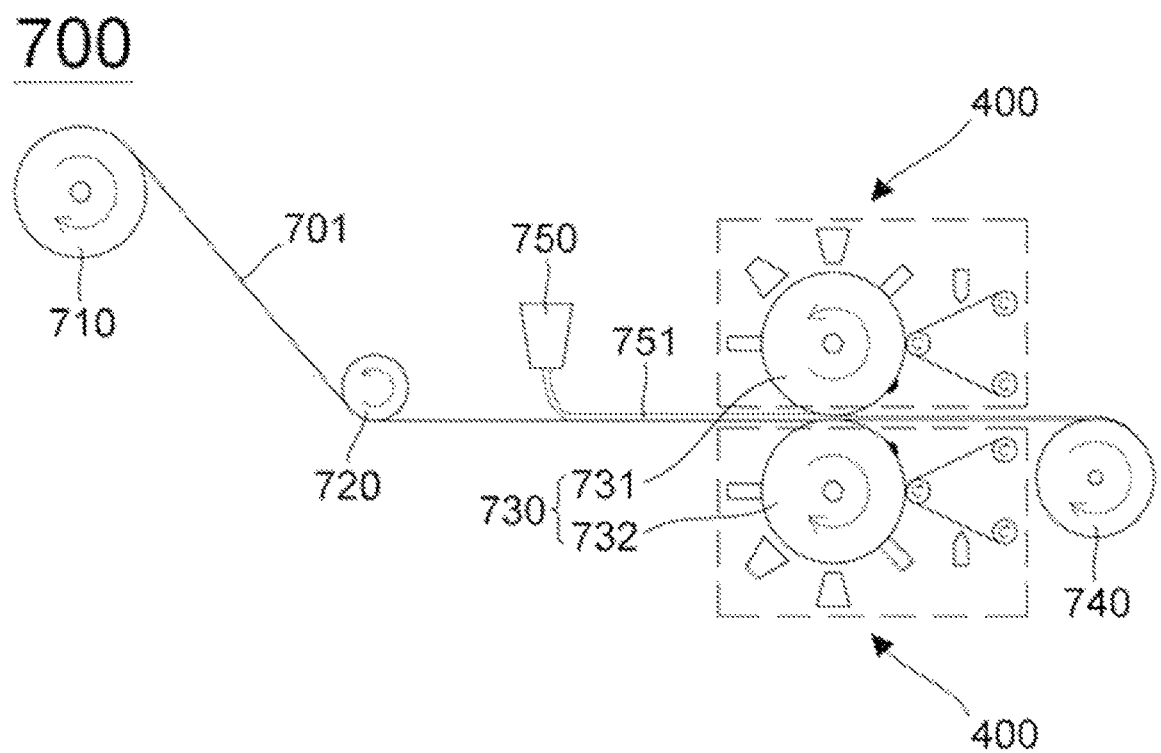

[FIG. 8]
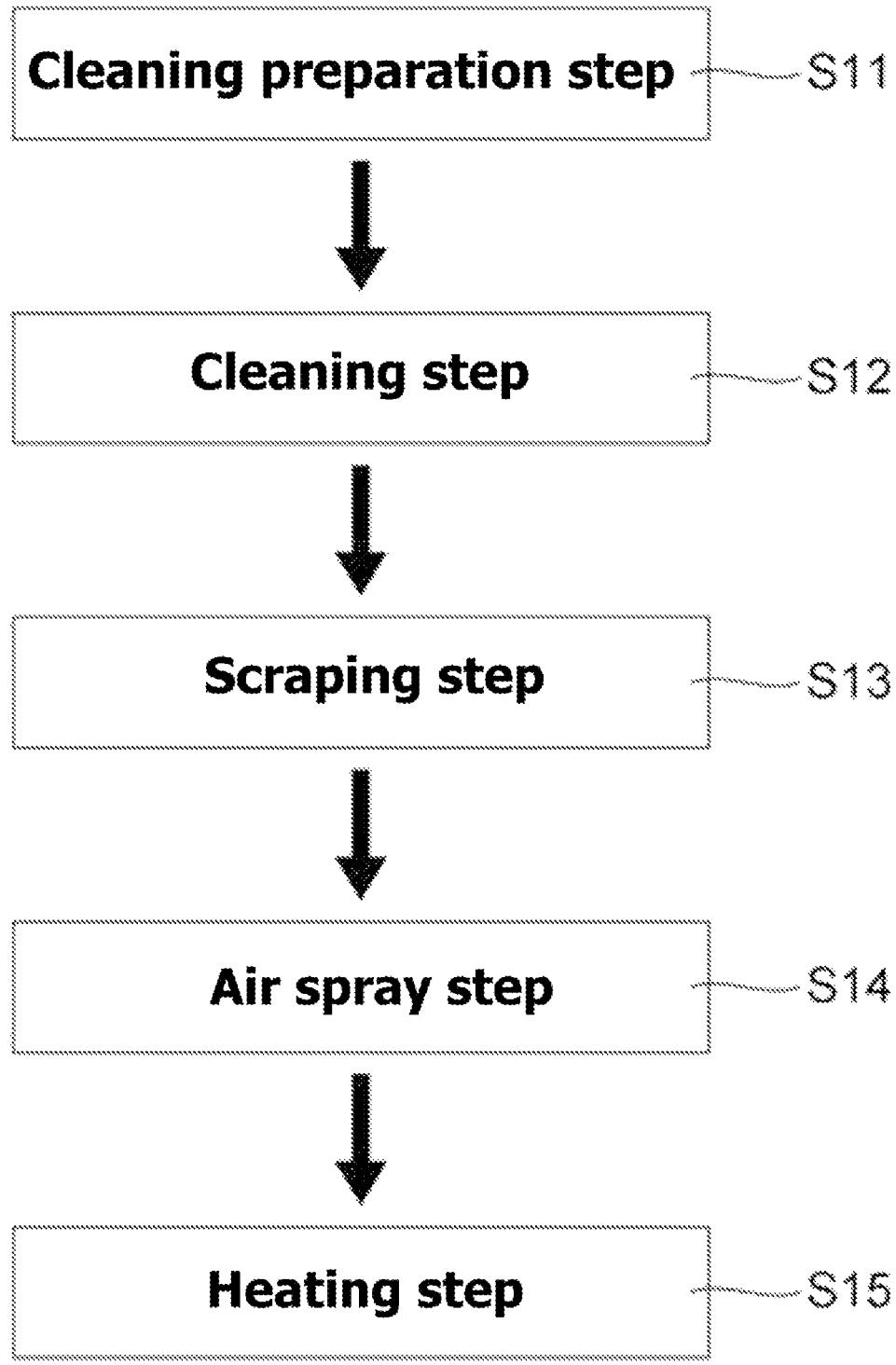

[FIG. 9]
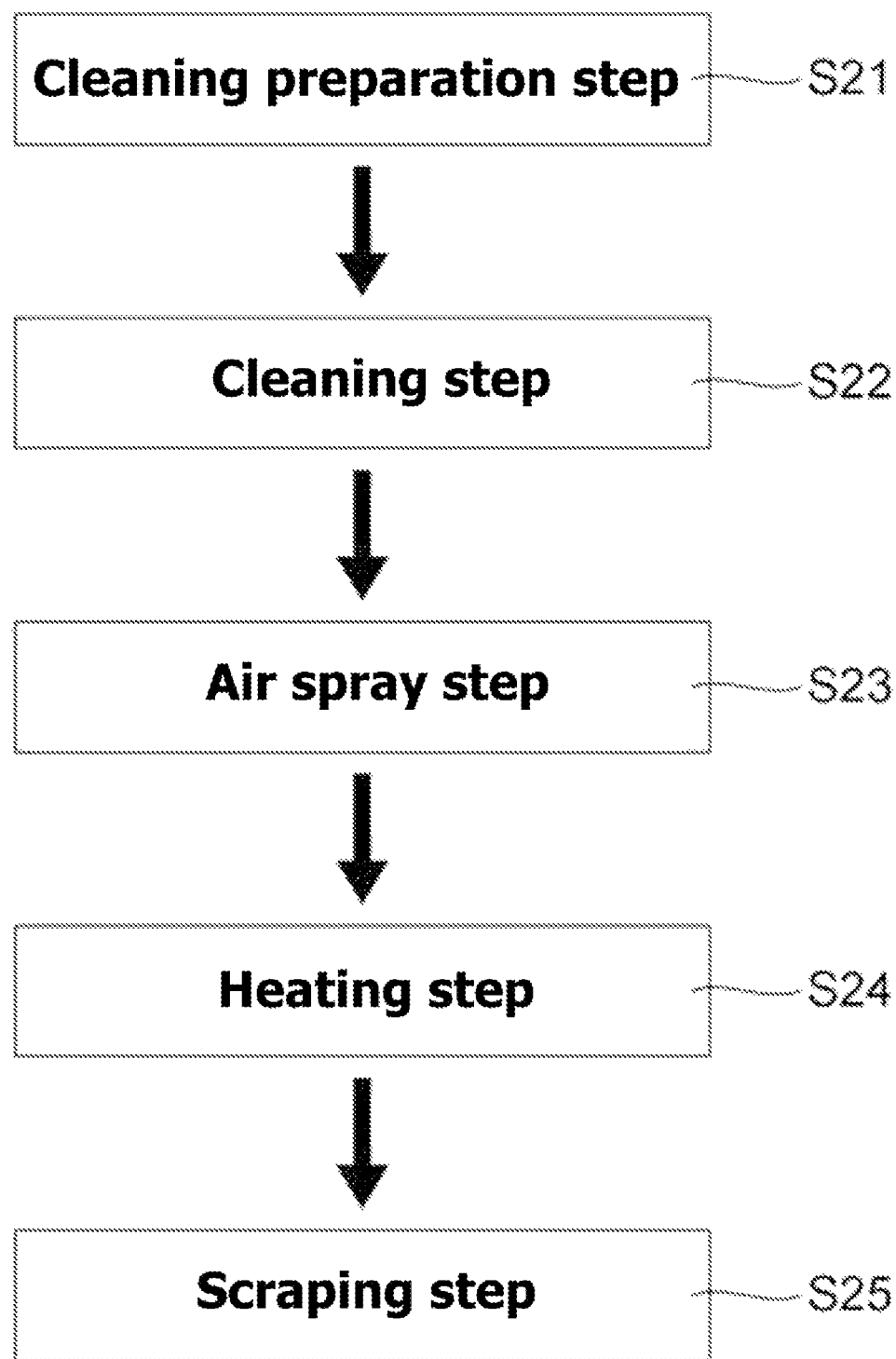

【FIG. 10】
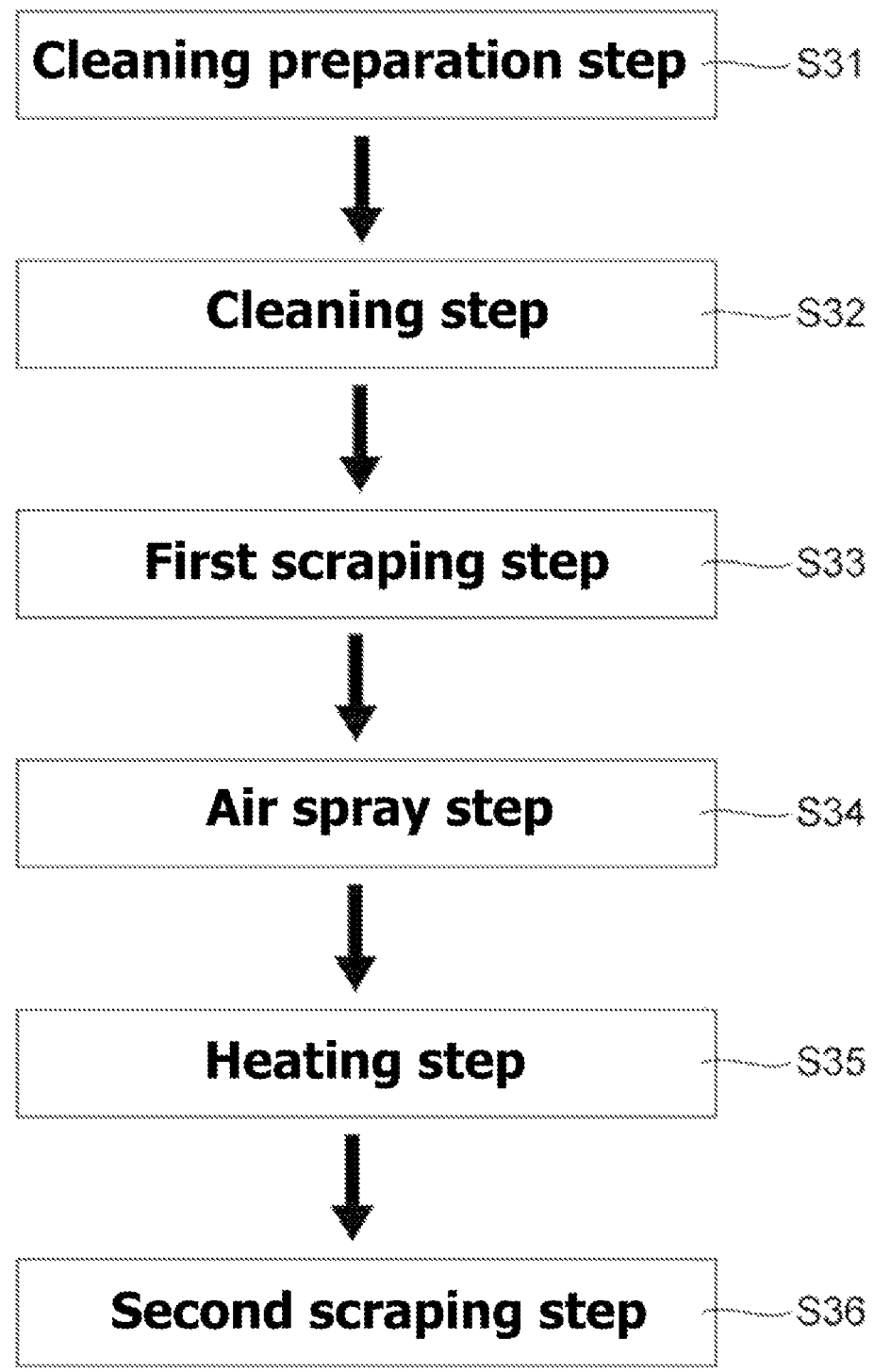

APPARATUS FOR CLEANING ROLLING ROLL FOR ELECTRODE AND CLEANING METHOD

CROSS-REFERENCE TO RELATED APPLICATIONS

The present application is a national phase entry under 35 U.S.C. § 371 of International Application No. PCT/KR2020/001178, filed on Jan. 23, 2020, which claims priority to Korean Patent Application No. 10-2019-0009708, filed on Jan. 25, 2019, the disclosures of which are incorporated herein by reference.

TECHNICAL FIELD

The present invention relates to a rolling roll used in the electrode manufacturing process, and specifically relates to a rolling roll cleaning apparatus and a rolling roll cleaning method for cleaning a rolling roll.

This application claims the benefit of priority based on Korean Patent Application No. 10-2019-0009708, filed on Jan. 25, 2019, and the entire contents of the Korean patent application are incorporated herein by reference.

BACKGROUND ART

As the price of energy sources increases due to depletion of fossil fuels and the interest in environmental pollution increases, the demand for environmentally friendly alternative energy sources becomes an indispensable factor for future life. Especially, as technology development and demand for mobile devices are increasing, demand for secondary batteries as energy sources is rapidly increasing.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having high energy density, discharge voltage, and output stability.

Generally, in order to prepare a secondary battery, first, a positive electrode and a negative electrode are formed by applying an electrode mixture containing an electrode active material to a surface of a current collector, then a separate is interposed therebetween to thereby make an electrode assembly, which is then mounted in a cylindrical or rectangular metal can or inside a pouch-type case of an aluminum laminate sheet, and a liquid electrolyte in injected or impregnated into the electrode assembly or a solid electrolyte to prepare a secondary battery.

Further, secondary batteries are classified according to the structure of the electrode assembly having a positive electrode/separator/negative electrode structure. Representative examples thereof include a jelly-roll (wound) electrode assembly in which long sheet type positive electrodes and negative electrodes are wound with a separator interposed therebetween, a stacked electrode assembly in which a plurality of positive and negative electrodes cut in a predetermined size unit are sequentially stacked with a separator interposed therebetween, and a stacked/foldable electrode assembly in which bi-cells or full cells, in which positive and negative electrodes of a predetermined unit are stacked with a separator interposed therebetween, are wound with a separator sheet.

On the other hand, the electrode generates a current through the exchange of ions, and the positive electrode and negative electrode constituting the electrode has a structure in which the electrode active material is applied to the electrode current collector made of metal.

The separator is positioned between the positive electrode and the negative electrode of the battery to perform insulation and maintain the electrolyte to provide a passage for ion conduction.

The roll press process, the slitting process, the notching process, the lamination process, or the folding process for manufacturing the electrode and the separator and the like are mostly performed by a roll-to-roll process. Herein, the roll-to-roll process refers to a process in which a plurality of bendable metal foils and the like move between rollers and perform a process such as coating and printing.

That is, for example, by unwinding the roll winding the flexible, a thin sheet-like material, materials are supplied, the supplied materials are coated and printed, and then materials processed from another roll are rewound and retrieved. In particular, positive and negative electrodes for secondary batteries are made by applying a positive electrode active material or a negative electrode active material on a sheet and rolling the sheet.

In this rolling process, when rolling is repeatedly performed, if active materials or other foreign materials remaining after rolling are attached to the roll during rolling, foreign materials may adhere to the electrode in the subsequent rolling process, thereby reducing the quality of the electrode and the battery including the same. As such, an apparatus for cleaning a rolling roll by removing contaminants of a rolling roll is used.

On the other hand, in the conventional rolling roll cleaning apparatus, oil-based cleaning oil is sprayed on a cleaning member such as a cleaning roller through a nozzle, and the rolling roll is wiped with a cleaning member sprayed with cleaning oil.

However, when using such an oil-based cleaning solution, there was a limitation in removing contaminants. For example, in the case of the negative electrode rolling roll for rolling the negative electrode of the secondary battery, the solvent of the negative electrode is water, and thus there was a limitation in removing contaminants from the negative electrode rolling roll with only oil-based cleaning oil. Therefore, the pollutants could not be completely removed and the pollutants were likely to remain. Likewise, when rolling an electrode using a rolling roll in a state where contaminants remain, there was a problem in that defects such as occurrence of being stamped of the electrode surface and electrode detachment due to contaminants on the rolling roll surface were generated.

Therefore, there is a need to develop a rolling roll cleaning apparatus for solving the above problems.

DISCLOSURE

Technical Problem

It is an object of the present invention to solve the above-mentioned problems of the prior art and the technical problems required from the past.

An object of the present invention is to provide an apparatus and method for cleaning an electrode rolling roll capable of effectively removing contaminants by providing an air spray unit, a heating unit and a scraper unit, and using aqueous cleaning liquid as cleaning liquid.

Technical Solution

Therefore, in order to achieve the above object,

An apparatus for cleaning an electrode rolling roll by removing contaminants from the electrode rolling roll according to the present invention may include:

a cleaning part configured to bring the rolling roll into contact with the cleaning member to thereby clean the rolling roll;

an air spray unit configured to spray air to the rolling roll;

a heating unit configured to dry the rolling roll by applying heat to the rolling roll; and a scraper unit configured to mechanically remove cleaning liquid and foreign substances attached to the rolling roll.

Further, in the apparatus for cleaning an electrode rolling roll according to the present invention, the cleaning part may include: a supply roll configured to supply a cleaning member;

a cleaning unit configured to bring the cleaning member into contact with the rolling roll to thereby clean a surface of the rolling roll;

a cleaning liquid spray unit configured to spray cleaning liquid onto the cleaning member; and a winding roll configured to recover the cleaning member having cleaned the surface of the rolling roll.

Further, in the apparatus for cleaning an electrode rolling roll according to the present invention, the cleaning member may be non-woven fabric.

Further, in the apparatus for cleaning an electrode rolling roll according to the present invention, the cleaning liquid may be at least one selected from the group consisting of water and alcohol-based compounds.

Further, in the apparatus for cleaning an electrode rolling roll according to the present invention, a moving direction of the cleaning member may be a direction opposite to a rotational direction of the rolling roll.

Further, in the apparatus for cleaning an electrode rolling roll according to the present invention, the scraper unit may include:

a scraping pad having a tip portion formed therein to thereby scrape off foreign materials attached to the surface of the rolling roll in contact with the surface of the rolling roll;

a moving rail configured to provide a path for reciprocating the scraper unit in a front-rear direction; and a body unit having a moving member for moving a pad holder and a scraper unit for fixing the scraping pad along the moving rail, at an external side, and having a motor for providing power for driving the moving member, at an inside.

Further, in the apparatus for cleaning an electrode rolling roll according to the present invention, the scraper unit may be located between the cleaning part and an air spray unit.

Further, in the apparatus for cleaning an electrode rolling roll according to the present invention, the scraper unit may be positioned next to the heating unit.

Further, in the apparatus for cleaning an electrode rolling roll according to the present invention, the tip portion may be V-shaped, U-shaped or "⌑"-shaped.

Further, in the apparatus for cleaning an electrode rolling roll according to the present invention, two or more scraper units may be installed within the apparatus.

Further, in the apparatus for cleaning an electrode rolling roll according to the present invention, the scraper unit may scrape off foreign materials while the tip portion repeatedly contacts and separates from the rolling roll at regular rolling distance intervals, as the scraper unit reciprocates on the moving rail by the moving member.

Further, in the apparatus for cleaning an electrode rolling roll according to the present invention, the scraper unit may scrape off foreign materials by bringing the tip portion into contact with the rolling roll by moving in a rolling roll direction each time when the rolling roll rolls the electrode by 250 to 350 m.

Further, in the apparatus for cleaning an electrode rolling roll according to the present invention, the tip portion may be in contact with the rolling roll for 5 to 15 seconds.

Further, in the apparatus for cleaning an electrode rolling roll according to the present invention, the air spray unit may be located next to the heating unit.

Further, in the apparatus for cleaning an electrode rolling roll according to the present invention, the apparatus may further include a foreign material collection container, and the foreign material collection container may be located below the upper roll and the lower roll constituting the rolling roll.

In addition, the present invention provides an electrode manufacturing apparatus, and the electrode manufacturing apparatus may include:

a current collector feeding roll for supplying an electrode current collector;

an electrode mixture coating device for applying an electrode mixture containing an electrode active material to the electrode current collector;

a guide roll for transferring the electrode current collector to a rolling roll;

a rolling roll consisting of an upper roll and a lower roll, and rolling the electrode current collector to which the electrode mixture has been applied;

a current collector winding roll for winding the electrode current collector; and a cleaning apparatus for cleaning the rolling roll, and the cleaning apparatus is as described above.

In addition, the present invention provides a method for cleaning an electrode rolling roll by removing contaminants from the electrode rolling roll, and the method may include:

a cleaning preparation step of spraying cleaning liquid onto a cleaning member;

a cleaning step of bringing the cleaning member into contact with the rolling roll to thereby clean a surface of the rolling roll;

a scraping step of scraping off foreign materials and cleaning liquid remaining on the surface of the rolling roll;

an air spray step of spraying air on the surface of the rolling roll; and a heating step of drying the rolling roll by applying heat to the rolling roll.

In the method for cleaning an electrode rolling roll according to the present invention, the scraping step can be performed after the heating step.

In the method for cleaning an electrode rolling roll according to the present invention, the scraping step may be performed twice between the cleaning step and the air spray step and after the heating step.

In the method for cleaning an electrode rolling roll according to the present invention, the air spray step may be performed after the heating step.

In addition, the present invention provides a method for manufacturing an electrode for a secondary battery, and the method may include:

forming a coating layer by applying an electrode mixture containing an electrode active material on an electrode current collector;

drying a ultrathin on which the coating layer has been formed and rolling the dried ultrathin with a rolling roll; and cleaning the rolling roll.

The step of cleaning the rolling roll is as described above.

Advantageous Effects

According to a method and apparatus for cleaning an electrode rolling roll, contaminants can be effectively removed by providing an air spray unit, a heating unit and a scraper unit, and even though aqueous cleaning liquid is used as cleaning liquid, after cleaning the rolling roll, there is no residual cleaning liquid remaining on the rolling roll, thereby preventing secondary contamination of the electrode, thereby reducing the incidence of defects in the electrode during electrode manufacturing.

BRIEF DESCRIPTION OF THE DRAWINGS

FIG. 1 is a view showing a rolling device of a general electrode.

FIG. 2 is a schematic view schematically showing an apparatus for cleaning an electrode rolling roll according to an embodiment of the present invention.

FIG. 3 is a schematic view schematically showing an apparatus for cleaning an electrode rolling roll according to another embodiment of the present invention.

FIG. 4 is a schematic view schematically showing an apparatus for cleaning an electrode rolling roll according to further another embodiment of the present invention.

FIG. 5 is a schematic view schematically showing the structure of a cleaning unit in an apparatus for cleaning an electrode rolling roll according to the present invention.

FIG. 6 is a schematic view schematically showing the structure of a scraper unit in an apparatus for cleaning an electrode rolling roll according to the present invention.

FIG. 7 is a schematic view schematically showing an apparatus for manufacturing an electrode for a secondary battery according to the present invention.

FIG. 8 is a flowchart illustrating a flow of a method for cleaning an electrode rolling roll according to an embodiment of the present invention.

FIG. 9 is a flowchart illustrating a flow of a method for cleaning an electrode rolling roll according to another embodiment of the present invention.

FIG. 10 is a flowchart illustrating a flow of a method for cleaning an electrode rolling roll according to further another embodiment of the present invention.

DETAILED DESCRIPTION OF THE PREFERRED EMBODIMENTS

The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

In the present specification, when a part is "connected" to another part, this includes not only "directly connected" but also "electrically connected" between the parts while having another element therebetween.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

As used throughout this specification, the terms "about", "substantially", and the like, are used to mean a value or something like this when unique manufacturing and material tolerances are presented, and the terms are used to prevent unscrupulous infringers from unfair use of the disclosure including accurate or absolute figures in order to aid in the understanding of the present disclosure.

Throughout this specification, the term "combination(s) thereof" included in the expression of the Markush form means one or more mixtures or combinations selected from the group consisting of the elements described in the Markush form representation, and it means to include one or more selected from the group consisting of the above components.

Hereinafter, the present invention will be described in detail.

FIG. 1 is a view showing a rolling device of a general electrode.

Referring to FIG. 1, the rolling device 100 of a general electrode allows the electrode 100 coated with the electrode mixture containing the electrode active material to pass through a space between a rolling roll 120 including an upper roll and a lower roll, to thereby perform a rolling process of the electrode. Therefore, when the foreign material or the electrode mixture is attached to the rolling roll 120 in the rolling process as described above, the electrode may be contaminated due to the attached foreign material or the electrode mixture in the rolling process of another electrode, which is not preferable.

FIG. 2 is a schematic view schematically showing an apparatus for cleaning an electrode rolling roll according to an embodiment of the present invention.

Referring to FIG. 2, the cleaning apparatus 200 of an electrode rolling roll according to the present invention includes: a cleaning part 210 for cleaning a rolling roll 203 by making the rolling roll 203 contact a cleaning member 215; an air spray unit 220 for spraying air to the rolling roll 203; a heating unit 230 for drying the rolling roll 203 by applying heat to the rolling roll 203; and a scraper unit 240 for mechanically removing residual cleaning liquid and foreign materials 204 attached to the rolling roll 203.

Also, referring to FIG. 2, the cleaning part 210, the scraper unit 240, the air spray unit 220, and the heating unit 230 are sequentially arranged along the rotational direction of the rolling roll 203. Herein, the sequential arrangement means that when the roll 203 rotates based on a point on the surface of the roll 203, one point on the surface of the roll 203 sequentially passes through the cleaning part 210, the air spray unit 220, the heating unit 230, and the scraper unit 240 along the rotation direction of the roll 203. At this time, the cleaning part 210, the air spray unit 220, the heating unit 230 and the scraper unit 240 are disposed at regular intervals along the surface of the roll 203. The foreign material attached to the roll 203 or the electrode mixture attached in the rolling process is removed while sequentially passing through the cleaning part 210, the scraper unit 240, the air spray unit 220, and the heating unit 230.

In addition, the rolling roll 203 is composed of an upper roll 201 and a lower roll 202. The cleaning part 210, the scraper unit 240, the air spray unit 220 and the heating unit 230 should be provided on the upper roll 201 and the lower roll 202, respectively. As a result, each component constituting the cleaning apparatus 200 has a structure that is symmetrical with respect to the electrode.

FIG. 5 is a schematic view schematically showing the structure of a cleaning part 210 in an apparatus 200 for cleaning an electrode rolling roll according to the present invention.

Referring to FIG. 5, in the cleaning apparatus 200 of the electrode rolling roll, the cleaning part 210 sprays a cleaning liquid to primarily remove the foreign material 204 attached to the surface of the rolling roll 203.

Specifically, the cleaning part 210 includes: a supply roll 211 for supplying a cleaning member 215; a cleaning unit 213 that makes the cleaning member 215 contact the rolling roll 203 to clean the surface of the rolling roll 203; a cleaning liquid spray unit 214 for spraying a cleaning liquid to the cleaning member 215; and a winding roll 212 for recovering the cleaning member 215 having cleaned the surface of the rolling roll 203.

As can be seen in FIG. 2, since the cleaning part 210 should first remove the foreign material attached to the rolling roll 203 after rolling, the rolling roll 203 is positioned at a closest location, in the rotational direction of the rolling roll 203, from the point where the electrode is rolled.

According to FIG. 5, the cleaning member 215 is unwound from the supply roll 211 and transferred to the cleaning unit 213. The cleaning unit 213 is adjacent to the surface of the roll 203 so that one side of the cleaning member 215 can contact the rolling roll 203. The cleaning member 215 passing through the cleaning unit 213 is recovered to a winding roll 212. If the cleaning unit 213 is capable of bringing the cleaning member 215 into contact with the rolling roll 203 while inducing the transfer of the cleaning member 215, the shape of the cleaning unit 213 is not limited. However, in general, the cleaning unit 213 takes the form of a roll for smooth transfer of the cleaning member 214, and in this case, the cleaning unit 213 may rotate at the same time according to the movement of the cleaning member 215. In addition, in the case that the contact portion between the cleaning unit 213 and the rolling roll 203 is rounded as described above, if the cleaning member 215 is in contact with the rolling roll 203, it is possible to prevent the rolling roll 203 from being damaged by the cleaning member 215.

There is no limit to the type of the cleaning member 215 as long as the foreign material attached to the rolling roll 203 can be absorbed or removed smoothly, and the surface of the rolling roll 203 is not damaged, but non-woven fabric is preferred in terms of cleaning ability. In addition, the material of the non-woven fabric is not limited in its kind as long as it can absorb or remove foreign substances. Cotton fiber, polyethylene fiber, polypropylene fiber, polyester, aramid fiber, cellulose fiber, rayon fiber or a mixture thereof may be used as the material of the non-woven fabric.

In addition, in order to increase the efficiency of cleaning by bringing the cleaning member 215 into contact with the rolling roll 203 for a long time and a large area, it is preferable that the moving direction of the cleaning member 215 is a direction opposite to the rotating direction of the rolling roll 203. That is, the rotation direction of the supply roll 211, the winding roll 212 and the cleaning unit 213 is preferably the same as the rotation direction of the rolling roll 203. When the moving direction of the cleaning member 215 is the same as the rotation direction of the rolling roll 203, in other words, when the rotation direction of the supply roll 211, the winding roll 212 and the cleaning unit 213 is the same as the rotation direction of the rolling roll 203, the effect of the foreign material being rolled between the cleaning member 215 and the rolling roll 203 may be shown, which may increase the efficiency of foreign material removal.

In the cleaning part 210, the cleaning liquid spray unit 214 sprays the cleaning liquid on the cleaning member 215.

Referring to FIG. 5, the cleaning liquid spray unit 214 includes a cleaning liquid storage tank 510, a cleaning liquid pump 520, a cleaning liquid suction pipe 530 and a discharge pipe 540 for discharging the cleaning liquid, a valve 550, and a nozzle 560. The valve 550 can control the sprayed amount of the cleaning liquid, and the cleaning liquid suction pipe 530 and the cleaning liquid discharge pipe 540 are connected to the cleaning liquid storage tank 510, the cleaning liquid pump 520, and the nozzle 560, so that the cleaning liquid stored in the cleaning liquid storage tank 510 may be sprayed to the nozzle 560. In addition, a motor (not shown) for operating the cleaning liquid pump 520 may be connected to the cleaning liquid pump 520. If the cleaning member 215 is capable of spraying the cleaning liquid to the cleaning member 215 before reaching the cleaning unit 213, there is no particular limitation on the position of the cleaning liquid spray unit 214 and the angle of the nozzle.

When the foreign material is rotated while attached to the surface of the rolling roll 203, the motor and the cleaning liquid pump 520 are operated to spray the cleaning liquid to the rolling roll 203, the cleaning liquid is pumped through the suction pipe 530 connected to the cleaning liquid storage tank 510, flows along the cleaning liquid discharge pipe 540, and is sprayed evenly to the cleaning member being transported through the nozzle 560.

The cleaning liquid is not limited in its kind as long as it can remove foreign substances and the like smoothly. For example, the cleaning liquid may be water, dimethyl carbonate, dimethyl formamide, N-methyl formamide, sulfolane (tetrahydrothiophene-1,1-dioxide), 3-methylsulfolan, N-butyl sulfone, dimethyl sulfoxide, pyroridinone (HEP), dimethylpiperidone (DMPD), N-methyl pyrrolidinone (NMP), N-methyl acetamide, dimethyl acetamide (DMAc), dimethylformamide (DMF), diethyl acetamide (DEAc) dipropyl acetamide (DPAc) ethanol, propanol, butanol, hexanol, ethylene glycol, tetrachloroethylene, propylene glycol, toluene, turpentine, methyl acetate, ethyl acetate, petroleum ether, acetone, cresol, glycerol, or the like.

In particular, an aqueous cleaning liquid may be used in the cleaning apparatus 200 of the electrode rolling roll according to the present invention, and specifically, one or more selected from the group consisting of water and alcohol-based compounds may be used. The aqueous cleaning liquid is advantageous when an aqueous solution is used in preparing the active material as described above, and in this case, an oil-based cleaning liquid is not preferable.

More specifically, the cleaning liquid may be a mixture of water and an alcohol-based compound, and the alcohol-based compound may be one selected from the group consisting of ethanol, propanol, butanol, pentanol, hexanol, isopropanol, heptanol, decanol, octanol, isodecanol, ethylene glycol, diethylene glycol, triethylene glycol, ethylene glycol methyl ether, diethylene glycol methyl ether, triethylene glycol methyl ether, ethylene glycol ethyl ether, diethylene glycol ethyl ether, triethylene glycol ethyl ether, ethylene glycol monopropyl ether, diethylene glycol monopropyl ether, triethylene glycol monopropyl ether, ethylene glycol monobutyl ether, ethylene glycol monohexyl ether, diethylene glycol monohexyl ether and triethylene glycol monohexyl ether. More preferably, the alcohol-based compound may be at least one selected from the group consisting of pentanol, hexanol, heptanol, octanol and decanol.

The cleaning liquid may contain 10 to 40% by weight, preferably 20 to 30% by weight of an alcohol-based compound based on the total weight of the cleaning liquid. Similarly, the cleaning liquid may contain 60 to 90% by weight, preferably 70 to 80% by weight of water based on the total weight of the cleaning liquid.

When the content of the alcohol-based compound exceeds 40% by weight and the content of water is less than 60%, the cleaning power may be reduced. When the water content exceeds 90% and the alcohol-based compound content is less than 10%, the cleaning liquid after cleaning may not be easily removed from the rolling roll surface.

In addition, the temperature of the cleaning liquid may be 15° C. to 35° C., more preferably 20° C. to 30° C. In general, the cleaning power improves as the temperature increases, but when the temperature of the cleaning liquid is high, the temperature of the rolling roll rises, and in this case, the quality of the electrode may decrease during electrode rolling, which is not preferable.

In addition, when the temperature is less than the above range, there is a problem that the cleaning power decreases because the temperature is too low.

Next, referring to FIG. 2, in the rolling roll 203 cleaned by the cleaning part 210, cleaning liquid and foreign substances remaining on the roll surface are removed by the scraper unit 240.

FIG. 6 is a schematic view schematically showing the structure of a scraper unit 240 in an apparatus for cleaning an electrode rolling roll according to the present invention.

Referring to FIG. 6, the scraper unit 240 may include: a scraping pad 610 having a tip portion formed to scrape off foreign substances attached to the surface of the rolling roll in contact with the surface of the rolling roll; a moving rail 620 for providing a path for reciprocating the scraper unit 240 in the front-rear direction; and a body unit 630 having a pad holder 631 for fixing the scraping pad and moving members 632 for moving the scraper unit 240 along the moving rail 620, formed on the outside, and having a motor (not shown) for providing power to drive the moving members, at the inside.

Specifically, the scraping pad 610 is located between the cleaning part 210 and the air spray unit 220 and scrapes off the foreign material attached to the surface of the rolling roll 203 cleaned by the cleaning part 210 to thereby mechanically remove bulky foreign materials and disperse the foreign materials to a small size. Here, the foreign material means the foreign material remaining on the surface of the rolling roll because it cannot be removed by the cleaning member and the remaining cleaning liquid remaining on the surface of the rolling roll in the cleaning process. In order to effectively remove foreign substances on the surface of the rolling roll 203, it is preferable that the width of the scraping pad 610 matches the length of the rolling roll 203. When the scraping pad 610 scrapes off foreign substances as described above, the bulky foreign substances are separated from the surface of the rolling roll 203 by the scraping pad 610.

In addition, the tip portion of the scraping pad 610 in contact with the rolling roll 203 may be V-shaped, U-shaped or "⌴"-shaped to effectively scrape foreign substances, and the V-shape or U-shape is more preferable in order to reduce the contact area with the tip portion of the rolling roll 203 to thereby scrape off foreign substances more effectively.

In addition, the scraping pad 610 is not limited in its kind as long as it can minimize friction with the rolling roll 203 to prevent damage to the rolling roll 203 due to friction with the rolling roll 203, but synthetic resin, silicone or urethane material is most preferred.

With respect to the body unit, the pad holder 631 formed on the body unit can fix and support the scraping pad 610 and can easily replace the pad due to wear of the scraping pad 610.

In addition, the moving members 632 preferably have a wheel shape or the like that can move along the moving rail 620. The moving rail 620 is installed parallel to the electrodes on both sides of the body unit 630 and is spaced apart at the same interval as that at which the moving members are spaced apart. In addition, as the scraper unit 240 reciprocates in the front-rear direction (parallel to the transfer direction of the electrode) of the rolling roll on the moving rail 620 by the moving member, the tip portion repeats contact and separation with the rolling roll. That is, the tip portion is repeatedly contacted with the rolling roll at regular intervals and then separated. When the tip is always in close contact with the rolling roll, wear of the pad occurs due to friction between the rolling roll and the scraping pad 610, and in severe cases, the pad fragments may fall off.

More specifically, in the scraper unit 240, the tip portion of the scraping pad 610 scrapes off foreign substances while repeating contact and separation with the rolling roll for a predetermined time for every predetermined rolling distance. Here, the rolling distance means the distance that the rolling roll rolled the electrode. For example, a rolling distance of 100 m means that the rolling roll rolled the electrode by 100 m.

With respect to the rolling distance, the scraper unit may scrape off foreign substances by moving in the rolling roll direction each time the rolling roll rolls an electrode between 250 and 350 m, thereby contacting the tip portion with the rolling roll. More preferably, each time the electrode is rolled between 280 and 320 m, the tip portion may be brought into contact with the rolling roll. When the rolling distance is less than 250 m, the scraping pad may frequently come into contact with the rolling roll, resulting in severe wear of the pad, and when the rolling distance exceeds 350 m, the frequency of scraping may be reduced and the effect of removing foreign substances may be reduced.

In addition, with respect to the rolling roll contact time of the tip portion, the tip portion may be in contact with the rolling roll for 5 to 15 seconds, and more preferably for 8 to 12 seconds. When the contact time with the rolling roll is less than 5 seconds, the scraping effect is reduced due to the short contact time, and if the contact time exceeds 15 seconds, the wear of the pad may become severe, which is not preferable.

Also, referring to FIG. 2, the air spray unit 220 sprays air on the surface of the rolling roll 203 to remove foreign substances. The air spray unit 203 is not limited in its shape, but may have a form in which several air spray nozzles (not shown) are arranged side by side along the width direction of the rolling roll 203. The air spray nozzle may be connected to an air supply unit that generates air to thereby receive air for spray. The foreign materials may be more mechanically dispersed through the air spray, and the foreign materials in the liquid form (e.g., residual cleaning liquid) may be dried and removed through air spray. Specifically, the air supply unit may include a compressor (not shown) and an air transfer pipe (not shown). The compressor generates compressed air, and the generated compressed air moves to the air spray nozzle through the compressed air transfer pipe.

At this time, the pressure of the sprayed air is preferably a pressure of 1 to 4 kg f/cm$^2$, more preferably 2 to 3 kg f/cm$^2$. If the pressure of the air is less than 1 kg f/cm$^2$, the pressure of the sprayed air is too low to achieve the desired effect, and if the air pressure exceeds 4 kg f/cm$^2$, foreign matters on the surface may scatter around due to the high pressure, which is not preferable.

The heating unit 230 serves to dry by applying heat to the surface of the rolling roll 203. Through the heating, the foreign substances previously dispersed by air spray may be dried and removed from the roll surface, and residual foreign substances in liquid form can be removed by evaporation by application of heat. The heating unit 230 may be a heater type that directly applies heat to the surface of the rolling roll 203, or may be a hot air drying type that applies hot air to the surface of the rolling roll 203.

In addition, the temperature of the surface of the rolling roll 203 may be increased by the heating unit 230. At this time, the temperature of the surface of the rolling roll may be 20 to 60° C., preferably 30 to 50° C. When the temperature of the rolling roll surface is less than 20° C., the temperature may be low, so that foreign matter drying or evaporation may not be smooth. When the temperature of the rolling roll surface exceeds 60° C., the temperature of the rolling roll surface is too high, which may degrade the quality of the electrode during electrode rolling.

In addition, in FIG. 2, it is illustrated that the heating unit 230 is disposed after the air spray unit 220, but the order may be changed. The air spray unit 220 may be disposed after the heating unit 230. In this case, foreign materials that remain after being primarily removed through the scraper unit 240 may be dried by the heating unit 230 and may be removed mechanically by the air spray unit 220.

Finally, the electrode rolling roll cleaning apparatus according to the present invention may further include a foreign material collection container 250. The foreign material collection container 250 is used for preventing the foreign material remaining on the surface of the rolling roll from falling on the surface of the electrode after the rolling roll has passed through the cleaning part, the scraper unit, the air spray unit, and the heating unit, and is located at the bottom of the rolling roll. Here, the lower portion of the rolling roll means the lower portion of each of the upper roll and the lower roll, and the lower portion of the upper roll means a portion where the electrode rolls into the rolling roll between the upper roll and the electrode.

In addition, in the present invention, the arrangement order of the scraper units 240 may be adjusted.

FIG. 3 is a schematic view schematically showing an apparatus 300 for cleaning an electrode rolling roll according to another embodiment of the present invention.

Referring to FIG. 3, the scraper unit 240 is positioned next to the heating unit 230. That is, in the electrode rolling process, the foreign material 204 attached to the surface of the rolling roll 203 may be removed through the cleaning part 210, the air spray unit 220, the heating unit 230, and the scraper unit 240 in order.

At this time, the foreign material is first removed by the cleaning member 210 to which the cleaning liquid 210 is applied through the cleaning part 210, and the remaining foreign material is finely divided by the air spray unit 220 and the heating unit 230 to be removed and dried to remove the liquid component. The remaining dry components can be removed by scraping off of the scraping pad 610 of the scraper unit 240.

In addition, although FIGS. 2 and 3 show a cleaning apparatus in which only one scraper unit 240 is installed, two or more scraper parts 240 may be installed in the electrode rolling roll cleaning apparatus as necessary.

FIG. 4 is a schematic view schematically showing an apparatus 400 for cleaning an electrode rolling roll according to further another embodiment of the present invention.

Referring to FIG. 4, one of the scraper units 240 is located between the cleaning part 240 and the air spray unit 220, and the other is located after the heating unit 230. That is, in the electrode rolling process, the foreign material 204 attached to the surface of the rolling roll 203 may be removed through the cleaning part 210, the scraper unit 240, the air spray unit 220, the heating unit 230, and then finally another scraper unit 240 in order. In this case, the foreign material is primarily removed through the cleaning part 210, and the remaining foreign material and cleaning liquid may be removed through the air spray unit 210, the heating unit 230, and another scraper unit 240.

As described above, the cleaning apparatus for the electrode rolling roll according to the present invention includes an air spray unit, a heating unit, and one or more scraper units, to thereby effectively remove residual cleaning liquid and contaminants. Further, since no residual cleaning liquid remains on the rolling roll after cleaning the rolling roll even while an aqueous cleaning liquid is applied as the cleaning liquid, secondary contamination of the electrode to be manufactured afterwards is prevented, thereby making it possible to manufacture excellent quality electrodes.

Hereinafter, a method of cleaning an electrode rolling roll according to the present invention will be described.

FIG. 8 is a flowchart illustrating a flow of a method for cleaning an electrode rolling roll according to an embodiment of the present invention.

Referring to FIG. 8, the cleaning method of the electrode rolling roll may include: a cleaning preparation step (S11) of spraying cleaning liquid to a cleaning member; a cleaning step (S12) of cleaning the surface of the rolling roll by bringing the cleaning member into contact with the rolling roll; a scraping step (S13) of scraping off foreign substances and cleaning liquid remaining on the surface of the rolling roll; an air spray step (S14) of spraying air on the surface of the rolling roll; and a heating step of drying the rolling roll by applying heat to the rolling roll (S15).

As described above, the cleaning preparation step (S11) is a step of spraying a cleaning liquid to a cleaning member such as a non-woven fabric, and the cleaning liquid may be an aqueous cleaning liquid such as a mixture of water or alcohol.

When the cleaning liquid is sprayed on the cleaning member, the cleaning member is brought into contact with the rolling roll. At this time, as described above, it is preferable that the moving direction of the cleaning member and the rotating direction of the rolling roll are reversed to make contact.

After that, the foreign material attached to the surface of the roll is mechanically removed through the scraping step (S13), and is removed by drying through the air spray step (S14) and the heating step (S15).

In addition, the air spray step (S14) may be performed after the heating step (S15), and in this case, the foreign substances remaining after being primarily removed through the scraping step may be dried in the heating step (S15) and mechanically removed in the air spray step (S14).

FIG. 9 is a flowchart illustrating a flow of a method for cleaning an electrode rolling roll according to another embodiment of the present invention.

Referring to FIG. 9, in the cleaning method of the electrode rolling roll, a scraping step (S25) may be performed after the heating step (S24).

That is, in the electrode rolling process, foreign substances attached to the surface of the rolling roll may be removed in order through a cleaning preparation step (S21), a cleaning step (S22), an air spray step (S23), a heating step (S24), and a scraping step (S25). In this case, the foreign material is primarily removed by a cleaning member coated with a cleaning liquid in the cleaning step (S22), and the remaining foreign material is finely divided and removed and dried by the air spray step (S23) and the heating step (S24), to thereby remove the liquid element. The remaining dry components can be removed from the roll surface by a scraping step (S25). Similarly, the air spray step may be performed after the heating step.

FIG. 10 is a flowchart illustrating a flow of a method for cleaning an electrode rolling roll according to further another embodiment of the present invention.

Referring to FIG. 10, in the cleaning method of the electrode rolling roll, the scraping step may be performed twice between the cleaning step (S32) and the air spray step (S34) (first scraping step, S33) and after the heating step (second scraping step, S36).

That is, the foreign material attached to the surface of the rolling roll in the electrode rolling process may be removed through a cleaning preparation step (S31), a cleaning step (S32), a first scraping step (S33), an air spray step (S34), a heating step (S35), and a second scraping step (S36) in turn. In this case, the foreign material may be first removed by the cleaning member to which the cleaning liquid has been applied in the cleaning step, and then large size particles can be removed by the first scraping step. Thereafter, the remaining foreign matter can be dispersed and dried by an air spray step and a heating step and removed from the roll surface by a second scraping step. Similarly, the air spray step may be performed after the heating step.

In addition, the present invention provides an apparatus and a method for manufacturing an electrode for a secondary battery.

FIG. 7 is a schematic view schematically showing an apparatus for manufacturing an electrode for a secondary battery according to the present invention.

Referring to FIG. 7, an apparatus 700 for manufacturing an electrode for a secondary battery according to the present invention includes: a current collector feeding roll 710 for supplying an electrode current collector 701; an electrode mixture coating device 750 for applying an electrode mixture containing an electrode active material to the electrode current collector; a guide roll 720 for transferring the electrode current collector to a rolling roll; a rolling roll 730 for rolling the electrode current collector coated with the electrode mixture; an electrode winding roll 740 for winding the electrode coated with the electrode mixture; and a cleaning apparatus 400 for cleaning the rolling roll 730.

In addition, the method of manufacturing the electrode for the secondary battery includes: forming a coating layer by applying an electrode mixture containing an electrode active material on the electrode current collector; drying the ultra-thin layer on which the coating layer is formed and rolling with a rolling roll; and cleaning the rolling roll.

Specifically, the electrode is manufactured by a roll-to-roll process, and the current collector 701 is wound on the current collector feeding roll 710, unwound and transferred from the current collector feeding roll 710, and supplied to the rolling roll 730. The current collector is transferred by one or more guide rolls 720, and during the transfer process, an electrode mixture including an electrode active material or the like is applied by the electrode mixture coating device 750 to thereby form a coating layer 751. The current collector 701, on which the coating layer 751 is formed, is dried, and is rolled by the rolling roll 730. The rolled electrode is wound by an electrode winding roll 740. At this time, the upper roll 731 and the lower roll 732 constituting the rolling roll 730 are provided with a cleaning apparatus 400 as described above. As such, after rolling the electrode, a cleaning step may be performed for the rolling roll 730 by the cleaning device to thereby remove foreign substances and residual cleaning liquid.

In addition, the present invention provides an electrode for a secondary battery manufactured by the electrode manufacturing apparatus and the electrode manufacturing method, and a secondary battery including the same. In the secondary battery, an electrode assembly including at least two electrodes for the secondary battery and wound with a separator interposed between the electrodes is embedded in a battery case, and lithium salt-containing non-aqueous electrolyte is impregnated in the electrode assembly. The electrode for the secondary battery may be a positive electrode and/or a negative electrode.

The electrode assembly is not particularly limited as long as it has a structure made of a positive electrode and a negative electrode and a separator interposed therebetween, for example, a folding structure, or a stacked structure, or a stack/folding type (SNF) structure, or lamination/stack-type (LNS) structure.

The folding-type electrode assembly includes at least one positive electrode, at least one negative electrode, and at least one separator interposed between the positive electrode and the negative electrode and the positive electrode, the separator, and the negative electrode may have a structure in which one end and the other end do not cross each other.

Further, the stack-type electrode assembly includes at least one positive electrode, at least one negative electrode, and at least one separator interposed between the positive electrode and the negative electrode and the positive electrode, the separator, and the negative electrode may have a structure in which one end and the other end cross each other.

The stack/folding-type electrode assembly includes at least one positive electrode, at least one negative electrode, and at least one separator interposed between the positive electrode and the negative electrode, and the separator includes a first separator and a second separator. Further, the positive electrode, the first separator, and the negative electrode may have a structure in which one end and the other end do not cross each other. The second separator may have a structure surrounding an electrode side on which an electrode tab is not formed.

The electrode assembly of the lamination-stack structure may include one or more improved electrodes having a laminate laminated on one or both surfaces thereof. The improved electrode, for example, may be implemented in a structure in which the separator is bonded to one surface of the positive electrode or the negative electrode. In addition, the separator may be implemented in a structure that is bonded to both sides of the positive electrode or both sides of the negative electrode. In addition, the positive electrode, the separator and the negative electrode may be implemented in a structure that is bonded to each other in a state where the separator is interposed between the positive electrode and the negative electrode.

As described above, the secondary battery electrode may be manufactured by applying an electrode mixture containing an electrode active material on a current collector and then drying and rolling the electrode mixture. The electrode mixture may further include a binder, a conductive material, a filler, and the like, as necessary.

In the present invention, the positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

The sheet for the negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

In the present invention, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+a)}M_dO_{(2-e)}A_e$ such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, b+c+d<1, M=Al, Mg, Cr, Ti, Si or Y, and A=F, P or Cl); olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$).

Examples of the negative electrode active material include carbon such as non-graphitized carbon and graphite carbon; metal complex oxide such as $Li_xFe_2O_3$ ($0 \leq x \leq 1$), $Li_xWO_2$ ($0 \leq x \leq 1$), $Sn_xMe_{1-x}Me'_yOz$ (Me: Mn, Fe, Pb, Ge; Me': Al, B, P, Si, groups 1, 2, and 3 of the periodic table, halogen; $0 < x \leq 1$; $1 \leq y \leq 3$; $1 \leq z \leq 8$); lithium alloy; silicon alloy; tin alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for inhibiting expansion of an electrode, and is not particularly limited as long as it is a fibrous material without causing a chemical change in the battery. Examples of the filler include olefin polymers such as polyethylene and polypropylene; fibrous materials such as glass fibers and carbon fibers.

Other components, such as viscosity modifiers, adhesion promoters, and the like may be further included optionally or in combination of two or more. The viscosity modifier is a component that adjusts the viscosity of the electrode mixture so that the mixing process of the electrode mixture and the coating process on the current collector thereof may be easy, and may be added up to 30% by weight based on the total weight of the negative electrode mixture. Examples of such a viscosity modifier include carboxy methyl cellulose, polyvinylidene fluoride, and the like, but are not limited thereto. In some cases, the solvent described above may serve as a viscosity modifier.

The adhesion promoter is an auxiliary component added to improve the adhesion of the active material to the current collector and may be added in less than 10% by weight compared to the binder, and some examples thereof include oxalic acid, adipic acid, formic acid, acrylic acid derivatives, itaconic acid derivatives, and the like.

The separator is interposed between the positive electrode and the negative electrode, and an insulating thin film having high ion permeability and mechanical strength is used. The pore diameter of the separator is generally 0.01 to 10 micrometers, and the thickness is generally 5 to 300 micrometers. Examples of such a separator include olefin-based polymers such as polypropylene which is chemically resistant and hydrophobic; a sheet or a nonwoven fabric made of glass fiber, polyethylene or the like. When a solid electrolyte such as a polymer is used as the electrolyte, the solid electrolyte may also serve as a separator.

The lithium salt-containing non-aqueous electrolyte solution consists of an electrolyte and a lithium salt. And a non-aqueous organic solvent, an organic solid electrolyte, an inorganic solid electrolyte, and the like are used as the electrolyte solution.

Examples of the non-aqueous organic solvent include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc.

Examples of the organic solid electrolyte include a polymer electrolyte such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, a polymerizer including an ionic dissociation group, and the like.

Examples of the inorganic solid electrolyte include nitrides, halides, and sulfates of Li such as $Li_3N$, $LiI$, $Li_5NI_2$, $Li_3N-LiI-LiOH$, $LiSiO_4$, $LiSiO_4-LiI-LiOH$, $Li_2SiS_3$, $Li_4SiO_4$, $Li_4SiO_4-LiI-LiOH$, and $Li_3PO_4-Li_2S-SiS_2$.

The lithium salt is a substance that is soluble in the non-aqueous electrolyte. The examples of the lithium salt include $LiCl$, $LiBr$, $LiI$, $LiClO_4$, $LiBF_4$, $LiBioCho$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium 4-phenylborate, imide and the like.

For the purpose of improving charge/discharge characteristics, flame retardancy, etc., pyridine, triethylphosphite, triethanolamine, cyclic ether, ethylenediamine, n-glyme, hexaphosphoric triamide, nitrobenzene derivative, sulfur, quinone imine dye, N-substituted oxazolidinone, N,N-substituted imidazolidine, ethylene glycol dialkyl ether, ammonium salt, pyrrole, 2-methoxyethanol, aluminum trichloride, etc. may be added to the electrolyte. In some cases, a halogen-containing solvent such as carbon tetrachloride or ethylene trifluoride may be further added to impart nonflammability, or a carbon dioxide gas may be further added to improve the high-temperature storage characteristics, and FEC (Fluoro-EthyleneCarbonate), PRS (Propene sultone), and the like may be further added.

In one preferred example, a lithium salt such as $LiPF_6$, $LiClO_4$, $LiBF_4$, and $LiN(SO_2CF_3)_2$ may be added to a mixed solvent of a cyclic carbonate of EC or PC which is a high-dielectric solvent and a linear carbonate of DEC, DMC or EMC which is low viscosity solvent to thereby prepare a non-aqueous electrolyte containing a lithium salt.

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

Example 1

Copper foil with a width of 1000 mm and a thickness of 10 μm was used as the electrode current collector, and 95% by weight of carbon (electrode active material), 2.5% by weight of Super-C (conductive agent) and 2.5% by weight of SBR (binder) as an electrode mixture were added to a mixed solution of solvent CMC (carboxymethyl cellulose, water-based solvent) and distilled water to thereby prepare a mixture slurry. Thereafter, the slurry was applied to the current collector, dried and then rolled and wound to thereby prepare an electrode.

The rolling roll used in the rolling process was cleaned using a cleaning apparatus. The cleaning apparatus was used as shown in FIG. 2. In this case, a mixture of water and n-octanol in a weight ratio of 8:2 was used as the cleaning liquid. As the cleaning member, a nonwoven fabric made of viscose rayon and polyethylene terephthalate (PET) composite material was used. At this time, the scraper unit moves to the rolling roll each time the rolling roll rolls an electrode of 300 m, to thereby bring the tip portion into contact with the rolling roll and scrap off the foreign material by the contact for 10 seconds.

Example 2

In the cleaning apparatus, an electrode was manufactured using the same cleaning apparatus as in Example 1, except that the positions of the air spray unit and the heating unit were changed.

Example 3

An electrode was manufactured in the same manner as in Example 1, except that a cleaning apparatus having the structure shown in FIG. 3 was used as the cleaning apparatus.

Example 4

An electrode was manufactured in the same manner as in Example 1, except that a cleaning apparatus having the structure shown in FIG. 4 was used.

Comparative Example 1

Electrodes were prepared in the same manner as in Example 1, except that a cleaning apparatus of a rolling roll was not used in the electrode manufacturing process.

Comparative Example 2

The electrode was manufactured in the same manner as in Example 1, except that in the cleaning apparatus of Example 1, there was no air spray unit, heating unit, and scraper unit, and a cleaning apparatus having only a cleaning part was used.

Experimental Example 1

The L*a*b* colorimeter (Labscan XE, HauterLab Co., Ltd.) was measured for the rolling roll before electrode rolling to measure the initial color coordinate L* value, the electrode was manufactured by 1500 m, and the L* value of the rolling roll was then measured. Then, the change amount (ΔL*) of the color coordinate L* value was measured. In addition, it was checked whether there was a phenomenon that the electrode was stamped by the foreign material attached to the rolling roll. The results are shown in Table 1 below.

A colorimeter is a device for measuring the color of objects known in the art. L*a*b* colorimeter was defined by International Communication on Illumination (CIE) and is a device that displays one color as a position (x, y, z) in a uniform three-dimensional color space composed of X-axis, Y-axis, and Z-axis. Since the colorimeter shows a very close difference from the eye, it is currently standardized worldwide. Among them, the color coordinate L* is a value related to the measured lightness and is displayed from 0 to 100. The a and b values are flat coordinate systems, with the horizontal axis a and the vertical axis b. The +a side is red, the −a side is green, the +b side is yellow, and the −b side is blue.

TABLE 1

| Division | ΔL* | electrode stamped |
|---|---|---|
| Example 1 | 16 | X |
| Example 2 | 16 | X |
| Example 3 | 15 | X |
| Example 4 | 14 | X |
| Comparative Example 1 | 50 | O |
| Comparative Example 2 | 30 | O |

As can be seen in Table 1 above, in Examples 1 to 4 using the cleaning apparatus and the cleaning method according to the present invention, contaminants on the surface of the rolling roll can be effectively removed even if electrode rolling is repeated, compared to Comparative Example 1 and Comparative Example 2.

The above description is merely illustrative of the technical idea of the present invention, and those skilled in the art to which the present invention pertains may make various modifications and variations without departing from the essential characteristics of the present invention. Therefore, the embodiments disclosed in the present invention are not intended to limit the technical spirit of the present invention, but to explain the protection scope of the present invention and should be interpreted by the claims below, and it should be interpreted that all technical spirits within the equivalent scope are included in the scope of the present invention.

DESCRIPTION OF REFERENCE NUMERALS

200, 300, 400: rolling roll cleaning apparatus
201: upper roll
202: lower roll
203: rolling roll
204: foreign material
210: cleaning part
211: supply roll
212: winding roll
213: cleaning unit
214: cleaning liquid spray unit
215: cleaning member
220: air spray unit
230: heating unit
240: scraper part
250: foreign material collection container
510: cleaning liquid storage tank
520: cleaning liquid pump
530: cleaning liquid suction pipe
540: cleaning liquid discharge pipe
550: valve
560: nozzle
610: scraping pad
620: moving rail
630: body unit
631: pad holder
632: moving member
700: electrode manufacturing apparatus
701: current collector
710: current collector feeding roll
720: guide roll
730: rolling roll
731: upper rolling roll
732: lower rolling roll
750: electrode mixture coating device
751: coating layer
740: electrode winding roll

The invention claimed is:

1. An apparatus for cleaning an electrode rolling roll by removing contaminants from the electrode rolling roll, the apparatus comprising:
a cleaning part configured to bring the rolling roll into contact with a cleaning member to thereby clean the rolling roll;
an air spray unit configured to spray air to the rolling roll;
a heating unit configured to dry the rolling roll by applying heat to the rolling roll; and
a scraper unit configured to mechanically remove cleaning liquid and foreign substances attached to the rolling roll,
wherein the scraper unit comprises:
a scraping pad having a tip portion formed therein adapted to contact the surface of the rolling roll to thereby scrape off foreign materials attached to the surface of the rolling roll;
a moving rail configured to provide a path for reciprocating the scraper unit in a front-rear direction; and
a body unit having a moving member configured to move a pad holder and the scraper unit adapted to fix the scraping pad along the moving rail, at an external side, and having a motor configured to provide power for driving the moving member, at an inside, and
wherein the scraper unit is configured to scrape off foreign materials while the tip portion repeatedly contacts and separates from the rolling roll at regular rolling distance intervals, as the scraper unit reciprocates on the moving rail by the moving member.

2. The apparatus of claim 1, wherein the cleaning part comprises:
a supply roll configured to supply the cleaning member;
a cleaning unit configured to bring the cleaning member into contact with the rolling roll to thereby clean a surface of the rolling roll;
a cleaning liquid spray unit configured to spray cleaning liquid onto the cleaning member; and
a winding roll configured to recover the cleaning member having cleaned the surface of the rolling roll.

3. The apparatus of claim 2, wherein the cleaning member is non-woven fabric.

4. The apparatus of claim 2, wherein the cleaning liquid is at least one selected from the group consisting of water and alcohol-based compounds.

5. The apparatus of claim 2, wherein a moving direction of the cleaning member is a direction opposite to a rotational direction of the rolling roll.

6. The apparatus of claim 1, wherein the scraper unit is located between the cleaning part and an air spray unit.

7. The apparatus of claim 1, wherein the scraper unit is positioned next to the heating unit.

8. The apparatus of claim 1, wherein the tip portion is V-shaped, U-shaped or "⊔"-shaped.

9. The apparatus of claim 1, wherein two or more scraper units are installed within the apparatus.

10. The apparatus of claim 1, wherein the scraper unit is configured to scrape off foreign materials by bringing the tip portion into contact with the rolling roll by moving in a rolling roll direction each time when the rolling roll rolls the electrode by 250 to 350 m.

11. The apparatus of claim 1, wherein the tip portion is in contact with the rolling roll for 5 to 15 seconds.

12. The apparatus of claim 1, wherein the air spray unit is located next to the heating unit.

13. The apparatus of claim 1, further comprising: a foreign material collection container,
  wherein the foreign material collection container is located below an upper roll and a lower roll constituting the rolling roll.

* * * * *